(12) United States Patent
Park et al.

(10) Patent No.: US 8,649,318 B2
(45) Date of Patent: Feb. 11, 2014

(54) METHOD AND APPARATUS OF PAGING AN IDLE MODE STATION IN MULTI-HOP RELAY COMMUNICATION SYSTEM

(75) Inventors: Giwon Park, Gyeonggi-do (KR);
Kiseon Ryu, Gyeonggi-Do (KR);
Genebeck Hahn, Gyeonggi-Do (KR);
Heejeong Cho, Gyeonggi-Do (KR);
Yongho Kim, Gyeonggi-Do (KR);
Youngsoo Yuk, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/389,406

(22) PCT Filed: Aug. 24, 2010

(86) PCT No.: PCT/KR2010/005654
§ 371 (c)(1),
(2), (4) Date: Feb. 7, 2012

(87) PCT Pub. No.: WO2011/025231
PCT Pub. Date: Mar. 3, 2011

(65) Prior Publication Data
US 2012/0134318 A1 May 31, 2012

Related U.S. Application Data

(60) Provisional application No. 61/236,157, filed on Aug. 24, 2009, provisional application No. 61/236,858, filed on Aug. 25, 2009, provisional application No. 61/240,623, filed on Sep. 8, 2009, provisional application No. 61/240,655, filed on Sep. 9, 2009.

(30) Foreign Application Priority Data

Jan. 8, 2010 (KR) .......................... 10-2010-0001963

(51) Int. Cl.
*H04B 7/14* (2006.01)
(52) U.S. Cl.
USPC ......................................................... 370/315
(58) Field of Classification Search
USPC .............. 370/310, 310.2, 312, 315, 322, 351, 370/389, 392; 455/11.1, 436, 458, 463, 574
See application file for complete search history.

(56) References Cited

U.S. PATENT DOCUMENTS 6,138,001 A * 10/2000 Nakamura et al. ........... 340/7.35
2006/0014550 A1 * 1/2006 Ryu et al. ..................... 455/458

(Continued)

OTHER PUBLICATIONS

Shkumbin Hamiti, The Draft IEEE 802.16m System Description Document, Jun. 11, 2008, IEEE,802.16m-08/003r2,1-58.*
LAN Standards Committee, "Part 16: Air Interface for Fixed and Mobile Broadband Wireless Access Systems", IEEE P802.16j/D7, Oct. 20, 2008.

(Continued)

*Primary Examiner* — Anh-Vu Ly
*Assistant Examiner* — Gustavo Lopez-Vargas
(74) *Attorney, Agent, or Firm* — McKenna Long & Aldridge LLP (57) ABSTRACT

Disclosed is a method of paging an idle-mode terminal in a multi-hop relay communication system, the method including receiving an idle mode request message from the terminal, sending an idle mode response message to the terminal, the idle mode response message including paging information, receiving a superframe from a base station, the superframe including a paging message of the terminal, and staggering the superframe number by a multi-hop count apart from the base station so as to send to the terminal.

7 Claims, 4 Drawing Sheets

(56) References Cited

U.S. PATENT DOCUMENTS

2007/0211661 A1* 9/2007 Tee et al. ................. 370/329
2008/0130770 A1* 6/2008 Khandekar et al. ........... 375/260
2008/0212516 A1* 9/2008 Son et al. .................. 370/315
2009/0303953 A1* 12/2009 Kang et al. ................. 370/329

OTHER PUBLICATIONS

Hamiti, "The draft IEEE 802.16 System Description Document", IEEE 802.16,08/003r2, Jun. 11, 2008.

* cited by examiner

METHOD AND APPARATUS OF PAGING AN IDLE MODE STATION IN MULTI-HOP RELAY COMMUNICATION SYSTEM

This application is a 35 U.S.C. §371 National Stage entry of International Application No. PCT/KR2010/005654, filed on Aug. 24, 2010, and claims the benefit of U.S. Provisional Application Nos. 61/236,157 filed on Aug. 24, 2009, 61/236,858, filed Aug. 25, 2009, 61/240,623, filed Sep. 8, 2009, and 61/240,655 filed Sep. 9, 2009, and Korean Patent Application No. 10-2010-0001963, filed Jan. 8, 2010, all of which are incorporated by reference in their entirety herein.

TECHNICAL FIELD

The present invention relates to a paging method in a multi-hop relay communication system and an apparatus thereof, and more particularly, a paging method and apparatus capable of minimizing a paging delay of an idle mode terminal as well as reducing overhead of a paging message.

BACKGROUND ART

In general, a cellular network sets up radio (wireless) communication links with high inter-reliability through a centralized cell design for allowing communications between a base station and terminals via a direct link within a cell in coverage of the base station. However, recent communication networks gradually need higher service frequency bands, and radii of cells are getting shorter for high-speed communications and reception of more traffic. Consequently, many problems occur in applying from now on the existing centralized cellular radio network without change. That is, the fixed position of the base station decreases flexibility of the configuration of radio links, which causes difficulty in providing efficient communication services under radio environments of changeable traffic distributions or traffic demands.

Hence, the next-generation communication system should be dispersively controlled and constructed, and also actively deal with the environmental changes, such as addition of a new base station.

In order to solve such problems, a multi-hop relay system has been proposed. The relay system has several advantages of widening a cell service area by covering a partial shadowy area generated within a cell region, increasing a system capacity, and reducing a burden of an initial installation cost by use of a relay for an initial situation with less service demands.

In a relay type communication system, upon a paging operation of a terminal, an additional paging delay may occur when the terminal receives a paging message from a base station due to existence of a relay node, as compared with a paging operation via a direct link between the base station and the terminal. In consideration of the paging delay, a method of informing a paging frame number having a paging message sent by a macro base station has been disclosed in IEEE 802.16J standard. That is, the base station informs a relay or a terminal of a frame number, in which the paging message is to be sent, via a paging advertisement message (PAG-ADV), and responsively the relay includes the paging message in the frame informed by the base station so as to deliver to the terminal.

However, as done in the related art method, if the paging message sent by the relay and the paging message sent by the base station use different frame numbers, additional information, such as a paging interval (TLV) and a frame number, should be included in the paging message whenever the paging message is sent from the base station to the relay, thereby causing paging overhead.

DISCLOSURE OF INVENTION

Solution to Problem

Therefore, to overcome the problems of the related art, an object of the present invention is to provide a paging method and apparatus capable of minimizing a paging delay of an idle mode terminal as well as reducing overhead of a paging message, in a multi-hop relay system.

To achieve these and other advantages and in accordance with the purpose of the present invention, as embodied and broadly described herein, there is provided a method of paging an idle-mode terminal in a multi-hop relay communication system, the method including receiving an idle mode request message from the terminal, sending an idle mode response message to the terminal, the idle mode response message including paging information, receiving a superframe from a base station, the superframe including a paging message of the terminal, and staggering the superframe number by a multi-hop count apart from the base station so as to send to the terminal.

In accordance with another embodiment, there is provided a method of paging an idle mode terminal in a multi-hop relay communication system, the method including receiving an idle mode request message from the terminal, sending an idle mode response message to the terminal, the idle mode response message including paging information, receiving superframe number offset information and a superframe including a paging message of the terminal from a base station, and staggering the number of the received superframe based upon the superframe number offset information sent by the base station to send to the terminal.

In accordance with one embodiment, there is provided a relay, characterized by transferring a paging message to an idle mode terminal in a multi-hop relay communication system, the relay including a receiver configured to receive a superframe from a base station, the superframe including a paging message of the idle mode terminal, a transmitter configured to send the superframe received from the base station to the terminal, and a controller configured to stagger the superframe number of the superframe received from the base station by a multi-hop count apart from the base station so as to send to the idle mode terminal, wherein the superframe is sent to the terminal via a downlink transmit zone.

In accordance with one embodiment, there is provided a terminal, characterized by operating in an idle mode in a multi-hop relay communication system, the terminal including a transmitter configured to send an idle mode request message to a base station or a relay, a receiver configured to receive an idle mode response message including paging information and a superframe including a paging message from the base station or the relay, and a controller configured to shift the received superframe based upon multi-hop relay count information, the multi-hop relay present between the base station and the terminal, and a delay time on a relay link so as to monitor the paging message.

MODE FOR THE INVENTION

Description will now be given in detail of preferred configurations of mobile devices according to the present invention, with reference to the accompanying drawings. This specification employs like/similar reference numerals for like/similar components irrespective of different embodiments, so they all will be understood by the first description. In explaining the present disclosure, if a detailed description for the related art is determined to make the main concept of the present disclosure obscure, the detailed description will be omitted. Also, the accompanying drawings are merely illustrative to help understanding of the scope of the present disclosure, so they should not be construed as limiting the scope of the present disclosure.

A communication system according to the present disclosure may be a system for providing various types of communication services, such as voice and packet data and the like, and include a base station, a relay node and a terminal.

The term 'relay node' may also be replaced with a relay, a relay station (RS) and the like, and may be fixed at one position or have mobility.

The term 'terminal' may also be replaced with a subscriber station (SS), a user equipment (UE), a mobile equipment (ME), a mobile station (MS) and the like, and include portable devices having a communication function, such as a cellular phone, a personal digital assistant (PDA), a smart phone and the like, and stationary devices, such as a personal computer (PC), an on-board equipment and the like.

The base station may indicate a fixed point where communications between the base station and the terminal are allowed, and also be replaced with a base station (BS), an evolved-NodeB (eNB), a base transceiver system (BTS), an access point and the like. One or more cells may exist in one base station, and interfaces for transmission of user traffic or control traffic may be used between base stations. Also, downlink indicates a communication channel from a base station to a terminal, and uplink indicates a communication channel from the terminal to the base station.

Examples of multiple access schemes applied to a radio communication system according to the present disclosure may include a Code Division Multiple Access (CDMA), a Time Division Multiple Access (TDMA), a Frequency Division Multiple Access (FDMA), a Single Carrier-FDMA (SC-FDMA), an Orthogonal Frequency Division Multiple Access (OFDMA) or multiple access schemes such as other well-known modulation techniques.

Also, multiple access schemes for the downlink transmission and the uplink transmission may be different from each other. For example, the downlink transmission may employ the OFDMA, and the uplink transmission may employ the SC-FDMA.

A wideband radio access system according to the present disclosure may support an idle mode operation for minimization of power consumption by the terminal.

A plurality of base stations (BSs) or relay nodes (RNs) supporting the idle mode may belong to one paging group so as to define a paging zone. The paging group provides an adjacent range area, which can be paged through downlink when traffic targeting an MS is present.

The plurality of base stations or relays belonging to the paging group configure a paging zone, and base stations or relays belonging to the same paging zone may have the same paging cycle value and the same paging offset value.

As compared with a paging operation in a network without considering a relay, a paging operation in a network considering a relay node may cause an additional time delay when a terminal receives a paging message sent by a macro base station, due to multi-hop relays present between the macro base station and the terminal.

For solving the problem, a method of informing a relay of a frame number, in which a paging message sent by a macro base station is included, has been introduced in IEEE 802.16J standard. That is, the base station informs a relay (intermediate RS) or a terminal of a frame number, in which the paging message is sent, via a paging advertisement message (PAG-ADV), and responsively the relay includes the paging message in the frame informed by the base station so as to deliver to the terminal.

However, if the paging message sent by the relay and the paging message sent by the base station use different frame numbers, additional information, such as a paging interval (TLV) and a frame number, should be included in the paging message whenever the paging message is sent from the base station to the relay, thereby causing paging overhead.

Hence, the present disclosure proposes a method for reducing paging overhead by minimizing parameters (e.g., paging interval (TLV), frame number) included in a paging message and parameters included in a relay configuration command (RS_Config_CMD) message.

Also, the present disclosure proposes a method, in which if a paging controller sends a paging message for paging an accessed terminal to a base station via a relay, the base station can send a paging message (PAG-ADV) to the terminal without including a paging interval or a paging frame number in the paging message upon sending the paging message to the relay.

The base station and the relay in the multi-hop relay communication system may belong to the same paging group, and all of idle mode terminals belonging to the same paging group may be able to monitor the paging message sent by the base station or the relay by using paging information allocated upon entering an idle mode.

Here, the base station or the multi-hop relays may support paging operations of the idle mode terminals by use of the same paging information, and the base station may perform a one-time transmission of a paging message for paging all of the idle mode terminals present within the same paging zone.

Figure 1:
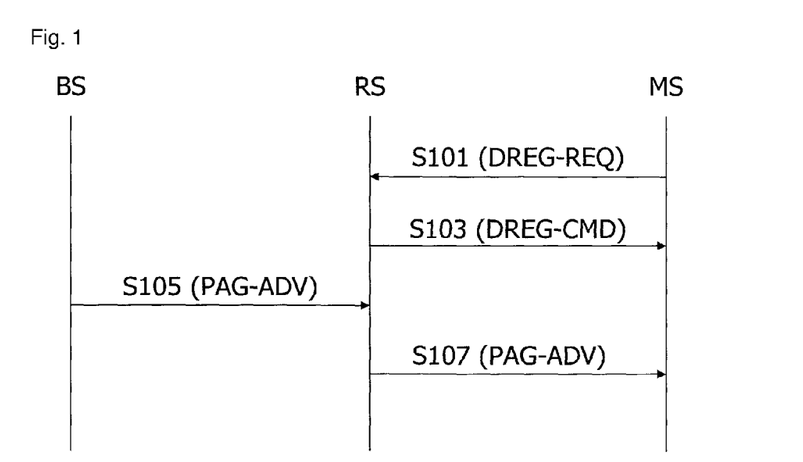
FIG. 1 illustrates a paging process of an idle mode terminal in accordance with one exemplary embodiment.

FIG. 1 illustrates a process of paging an idle mode terminal in accordance with one exemplary embodiment.

As shown in FIG. 1, it is assumed that one multi-hop is present between a base station (BS) and a relay (RS), the terminal (MS) is operating in an idle mode in the RS, and the BS and the RS belong to the same paging group.

Since the BS and the RS belong to the same paging group, all of the idle mode MSs present in the same paging group may monitor a paging message using the same paging information.

The MS sends an idle mode request message (DREG-REQ) to the RS (S101).

Upon reception of the idle mode request message from the MS, the RS sends an idle mode response message (DREG-CMD) including paging information to the MS (S103).

The paging information may include a paging group ID, a paging cycle, a listening interval and a paging offset. For example, it is assumed that the paging cycle is 50-superframe, the paging offset is a superframe number 47. Also, it is assumed that the listening interval is 1 superframe.

Here, the BS sends a paging message (PAG-ADV) to the RS by setting the paging message to a superframe number 47 for sending the paging message to an idle-mode MS present within the RS zone (S105).

The superframe received by the RS may be staggered in its superframe number as many as hop count in consideration of a delay via an RS link, so the RS receives the paging message sent by the BS at the superframe number 46.

Hence, the RS receives the paging message sent by the BS at the superframe number 46, and then transfers the paging message to the MS by setting the superframe number 47, which is designated to receive the paging message, to a paging offset (S107).

That is, since the RS has received the paging message sent by the BS at the superframe number 46, the RS may be able to send the paging message to the MS by using a paging offset (i.e., superframe number 47), which the MS has already known for reception of the paging message. Accordingly, the MS can monitor the paging message, sent by the RS, at the time point of the paging offset (i.e., superframe number 47) assigned upon entering an idle mode.

Figure 2:
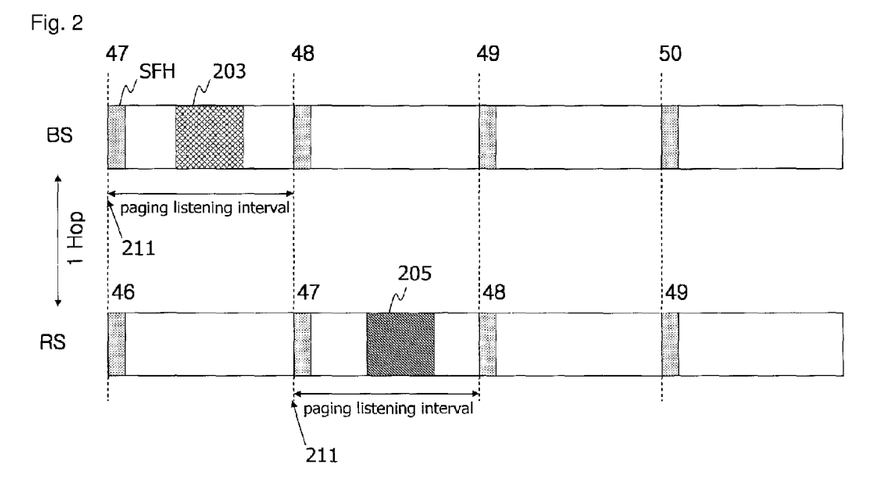
FIG. 2 illustrates formats of superframes sent by a base station and a relay in accordance with one exemplary embodiment.

FIG. 2 illustrates formats of superframes sent from a BS and an RS in accordance with one exemplary embodiment.

As described with reference to FIG. 1, the BS and the RS belong to the same paging group, and idle-mode MSs monitor a paging message by using the same paging information.

It is assumed that a paging cycle is 50-superframe, a paging offset 211 is superframe number 47, and a paging listening interval is 1 superframe.

The BS sends a paging message 203 to the RS at superframe number 47 for sending the paging message 203 to an idle-mode MS present within the RS zone (S105). Here, the RS receives the paging message 203 sent by the BS at superframe number 46 by considering a 1-hop RS link delay. Hence, the RS may be able to send the paging message to the MS by using a paging offset (i.e., superframe number 47), which the MS has already known for reception of the paging message. Accordingly, the MS may monitor the paging message, sent by the RS, at the time point of the paging offset (i.e., superframe 47) assigned upon entering an idle mode. The MS may also receive the paging message at the superframe number 47 corresponding to the already-known paging offset, even if it moves from the RS zone to another BS zone belonging to the same paging group or to another RS zone belonging to the same paging group during an idle mode operation.

As such, the MS can monitor the paging message sent by the BS or the RS by using the same paging information. Also, the BS may not have to send a paging message to the RS in advance, and the RS may stagger the superframe number so as to be allowed to send a paging message one time to idle-mode MSs present within the same paging group.

In accordance with another exemplary embodiment, the BS may send an RS_Config_CMD including superframe number offset information to the RS, so as to instruct a paging offset for transmission of a paging message by the RS.

Table 1 shows an example of RS_Config_CMD.

TABLE 1

| Name | Size (bit) | Description |
| --- | --- | --- |
| SFH information | TBD | System information for MS |
| RS ID | 48 | RS identification for MS |
| RS mode | TBD | Duplexing division mode (FDD, TDD) Scheduling mode, if needed Security mode, if needed TBD |
| RS frame configuration | TBD | 16 m DL access zone 16 m DL transmit zone 16 m DL receive zone 16 m UL transmit zone 16 m UL receive zone |
| Super-frame number action | 6 bit | LSB of super-frame number |
| RS EIRP | TBD | |
| RS paging group | TBD | RS Paging group ID |
| SA-Preamble | 9 bit | 2 bit: Segment Index, 7 bit: preamble sequence index |
| Superframe number offset | | RS staggers its superframe number, by the corresponding offset, from the superframe number of BS. |

The RS_Config_CMD message may include RS ID information (RS ID), a duplexing scheme, RS operation mode related information (RS mode), such as a scheduling mode and a security mode, RS frame configuration related information including a downlink access zone, a downlink transmit zone, a downlink receive zone, an uplink transmit zone, an uplink receive zone and the like, a superframe number action, RS paging group information and superframe number offset information.

The RS receives the RS_Config_CMD message including the superframe number offset information from the BS and then staggers its superframe number, by the corresponding offset, from the superframe number of the BS in a decreasing order.

Figure 3:
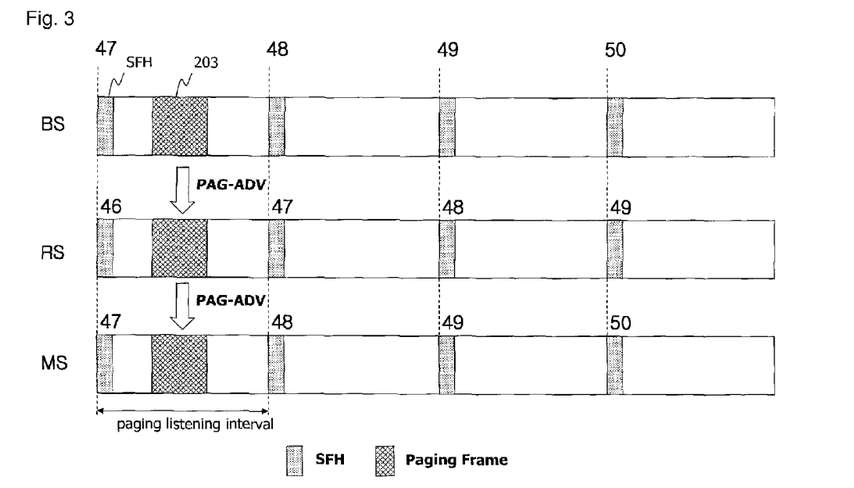
FIG. 3 illustrates formats of superframes sent and received among a base station, a relay and a terminal in accordance with another exemplary embodiment.

FIG. 3 illustrates formats of superframes sent and received among a BS, an RS and a MS in accordance with another exemplary embodiment.

The BS and the RS belong to the same paging group, and every idle-mode MSs present within the same paging group monitor a paging message using the same paging information.

Similar to the description with reference to FIG. 1, the MS sends an idle mode request message (DREG-REQ) to the RS, and receives a response message (DREG-CMD) including paging information from the RS.

In the paging information received from the RS, a paging cycle is 50-superframe, a paging offset is a superframe number 47, and a paging listening interval is 1 superframe.

The BS and the RS belong to the same paging group, so they send a paging message via the same paging information. That is, referring to FIG. 3, the BS first sends a paging message to the RS at superframe number 47 for sending the paging message to the MS located in an RS zone.

The RS then staggers its superframe number with reference to instruction information relating to an offset for staggering the superframe number sent via the RS_Config_CMD message, and then transfers a paging message (PAG-ADV) to the MS as soon as receiving the PAG-ADV message from the BS at superframe number 46.

The MS may receive the PAG-ADV message at its paging offset (i.e., superframe number 47) because the superframe number sent by the RS has been staggered by a RS link delay.

In accordance with another embodiment, the MS may know a paging frame number (PagingFrameRS) for implicitly monitoring the paging message sent by the RS, in consideration of a delay on an RS node (RSdelay) and a delay (Hopcount) according to Hop count.

The MS may know the paging frame number for implicitly monitoring the paging message sent by the RS according to the following Equation 1.

$$PagingFrame_{RS} = RSdelay * Hopcount \qquad [Equation\ 1]$$

The RS delay in Equation 1 indicates an RS link delay of a single hop.

The RS delay in Equation 1 may be known by the MS via message exchanges of Relay Station's Basic Capability Negotiation Request (SBC-REQ) and Relay Station's Basic Capability Negotiation Response (SBC-RSP) during a capability negotiation process.

Also, hop count information may be delivered from the BS or RS to the MS through a superframe header (SFH) or a network entry process.

By using the two parameters, namely, RS delay and hop count information, the MS can implicitly monitor the paging message (PAG-ADV), which is sent by the RS over an access link.

That is, the MS may monitor the PAG-ADV message sent by the RS by shifting the PAG-ADV message by PagingFrameRS at a paging offset of the BS. Here, the paging offset of the BS indicates a paging offset, which the MS has been assigned from the BS or RS through a request for an idle mode entry.

Figure 4:
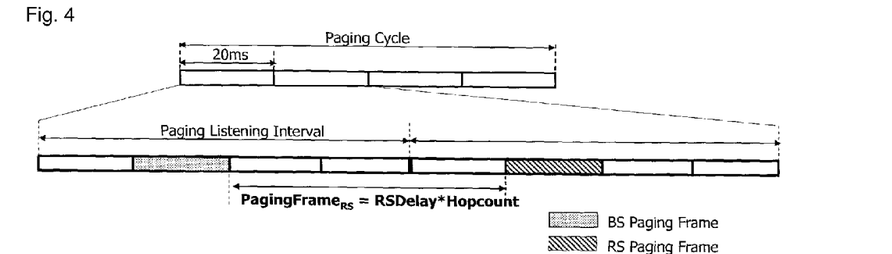
FIG. 4 illustrates that a terminal implicitly monitors a paging message sent by a relay, in consideration of a delay on a relay node (RSdelay) and a delay (hopcount) according to the number of hops (hop count)

FIG. 4 illustrates that a MS implicitly monitors a paging message sent by an RS, in consideration of a delay on an RS node (RSdelay) and a delay (hopcount) according to hop count.

The MS is allocated a paging cycle, a paging listening interval and a paging offset via the paging information transferred from the BS or RS upon an idle mode entry, and monitors the paging message by shifting the RS-sent paging message by PagingFrameRS.

In this embodiment, information relating to the delay on the RS node (RSdelay) and hop count needed for knowing PagingFrameRS may be received from the BS or RS through a network entry process.

In some cases, the information relating to RSdelay and hop count may be delivered to the MS by being included in a superframe header (SFH), a ranging message (RNG-REQ/RSP), an idle mode response message (DREG-CMD) or the like.

Alternatively, the information relating to RSdelay and hop count may be delivered to the MS via a broadcast message sent by the BS or RS.

Table 2 shows hop count information sent by being included in SFH or RNG-RSP.

TABLE 2

| Syntax | Size (bit) | Notes | Scope |
|---|---|---|---|
| Hop count | TBD | Number of RS links between the station transmitting this value and the BS | SFH or RNG-REQ/RSP |

In accordance with another embodiment, the MS may implicitly monitor the paging message sent by the RS through a method as shown in Equation 2.

$$PagingFrame_{RS} = MRSdelay \qquad [Equation\ 2]$$

The RS delay in Equation 1 indicates a link delay of a single hop, whereas MRS delay in Equation 2 indicates every multi-hop RS delay from an RS, to which the MS attached, to the BS.

Hence, in this embodiment, the MS-attached RS may transfer the MRS delay value to the idle-mode MS via SFH, NBR-ADV or PAG-ADV message.

In this embodiment, if the RS has no mobility and is present at a fixed position, it may be assumed that the MRS delay (multi-hop delay) may be a fixed value and the MS already knows the MRS delay value. In this case, the RS does not have to broadcast the MRS delay (multi-hop delay) information to the MS, and thus the MS may monitor the PAG-ADV message sent by the RS, using the MRS delay information, by shifting the PAG-ADV message by PagingFrameRS at the paging offset allocated upon an idle mode entry.

Table 3 shows RS delay and MRS delay values.

TABLE 3

| Syntax | Size (bit) | Notes | Scope |
|---|---|---|---|
| RS delay | — | Relay link Delay (Relay link delay between BS or RS and RS) | SFH, NBR-ADV, PAG-ADV |
| MRS delay | — | Relay link Delay (link delay between attached RS and BS) | SFH, NBR-ADV, PAG-ADV |

Referring to FIG. 3, RS delay value may be included in SFH or a message, such as NBR-ADV, PAG-ADV or the like, and the MRS delay value may be included in SFH or a message, such as NBR-ADV, PAG-ADV or the like.

Also, the present disclosure proposes the transmission of a PAG-ADV message through a downlink (DL) transmit zone via an access link between the BS or RS and the MS or an access link between the BS or RS and RS, so as to reduce overhead of the transmission of the PAG-ADV message sent by the BS.

That is, the related art method has been configured such that the BS sends PAG-ADV message to the MS via a DL access zone and sends PAG-ADV message to the RS via a DL transmit zone, accordingly, the BS should have sent the PAG-ADV message twice, thereby causing transmission overhead.

However, in the present disclosure, the BS can simultaneously send the PAG-ADV both to the RS and to the MS through a one-time transmission via the DL transmit zone.

Figure 5:
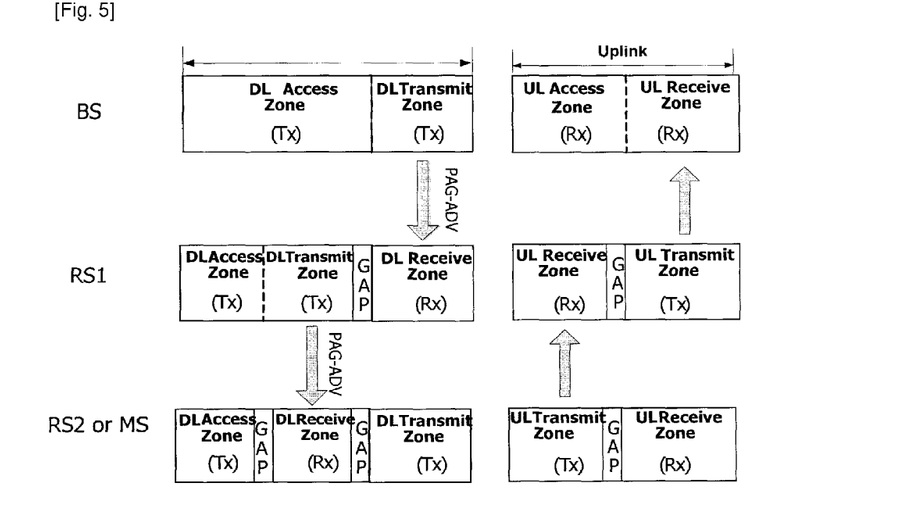
FIG. 5 illustrates a process of transmitting a paging message between a base station and a relay in a relay system.

FIG. 5 illustrates a process of transmitting a paging message between a BS and an RS in a RS system.

Referring to FIG. 5, a BS sends a paging message to an RS 1 via a DL transmit zone. After receiving the paging message from the BS via a DL receive zone, the RS 1 transfers the paging message to an RS 2 or a MS in the DL transmit zone.

Figure 6:
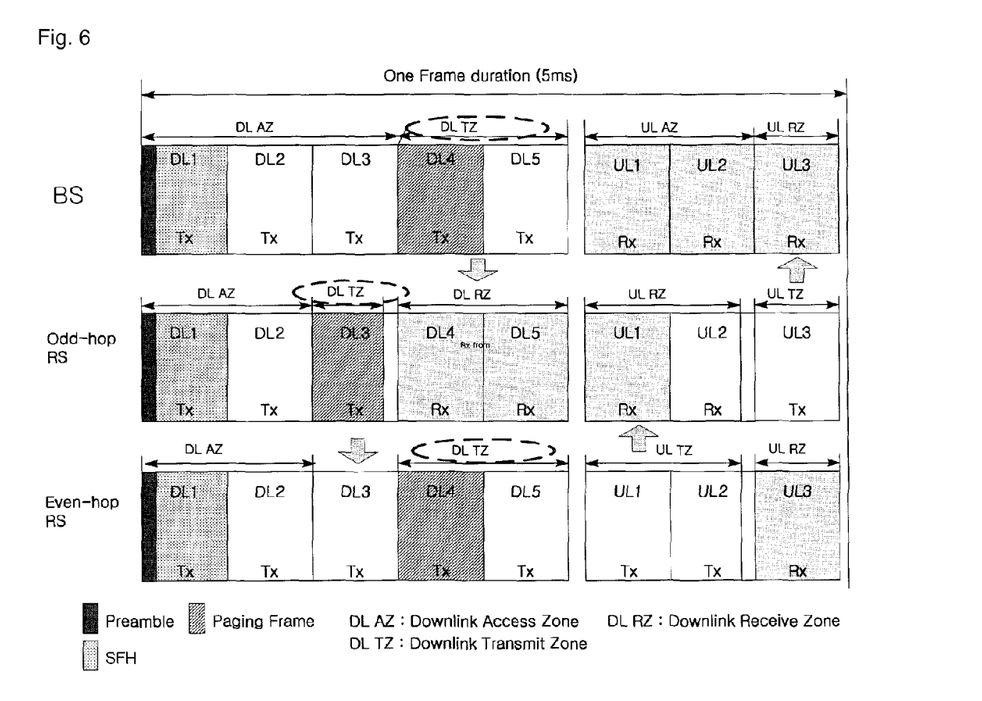
FIG. 6 illustrates in more detail the frame format of the base station and the relay in the relay system.

FIG. 6 illustrates in more detail the frame format of the BS and the RS in the RS system.

Referring to FIG. 6, the BS sends a paging message (DL4) to a first hop RS (i.e., odd-hop RS) or an idle-mode MS via a DL transmit zone, and the first hop RS also transfers a paging message (DL3) to a second hop RS (i.e., even-hop RS) or the idle-mode MS via the DL transmit zone. The even-hop RS also transfers the paging message DL4 to a third hope RS (i.e., odd-hop RS) or the idle-mode MS via the DL transmit zone.

Figure 7:
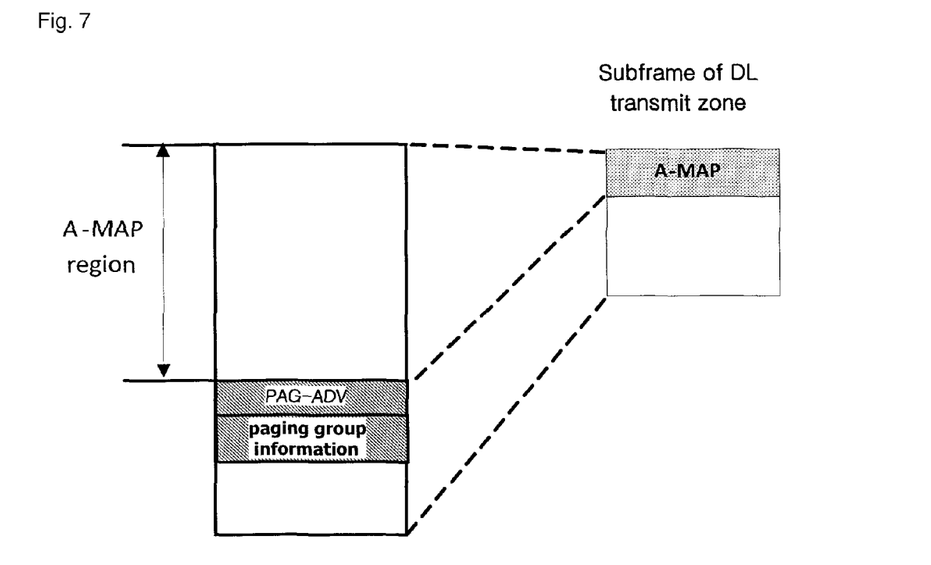
FIG. 7 schematically illustrates a format of a paging message sent over an air link.

FIG. 7 schematically illustrates a format of a paging message sent over an air link.

Paging group ID information, which is sent by the BS via an RS link in an idle mode of the MS, may be delivered via an RS_Config_CMD message.

Also, paging group ID information and a paging message sent by the BS or RS via an access link may be broadcast in a region immediately next to an A-MAP region, as shown in FIG. 7.

Furthermore, the paging group ID information may also be transferred to the MS via the DL transmit zone, similar to the PAG-ADV message.

Figure 8:
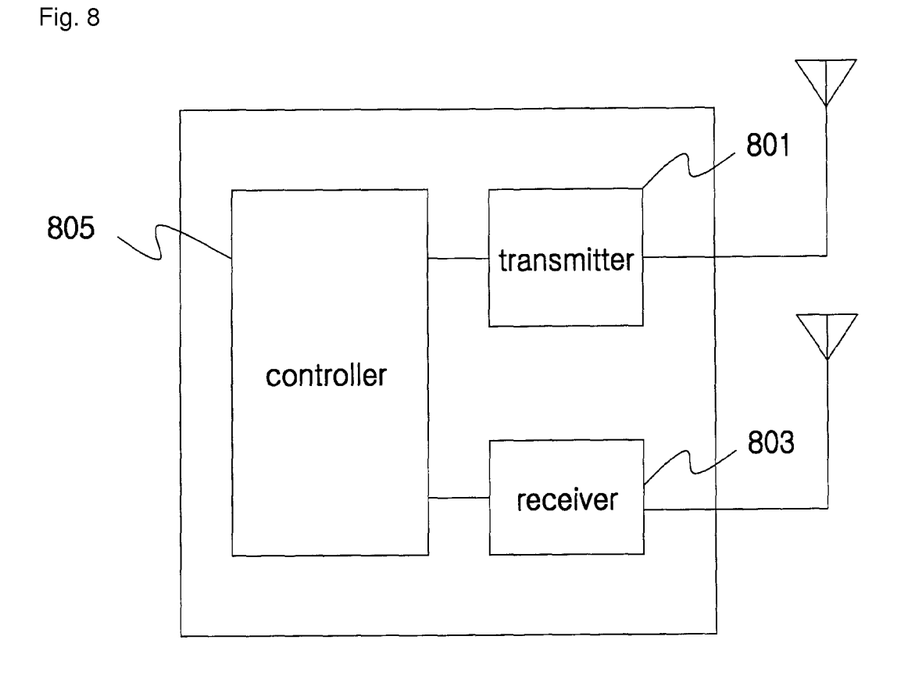
FIG. 8 is a block diagram illustrating a construction of a paging message transmitting/receiving apparatus (relay, terminal) in accordance with one exemplary embodiment.

FIG. 8 is a block diagram illustrating a construction of a paging message transmitting/receiving apparatus (relay, terminal) in accordance with one exemplary embodiment.

A relay (RS), which transfers a paging message received from a BS to an idle-mode MS, may include a receiver 801 configured to receive a superframe including the paging message of the idle-mode MS from the BS, a transmitter 803 configured to send the superframe sent by the BS to the MS, and a controller 805 configured to stagger the superframe number of the superframe sent by the BS by multi-hop count apart from the BS so as to send to the idle-mode MS. Here, the superframe is sent to the MS via a DL transmit zone.

A terminal (MS) operating in an idle mode in a multi-hop RS communication system may include a transmitter 801 configured to send an idle mode request message (DREG-REQ) to a BS or RS, a receiver 803 configured to receive an idle mode response message (DREG-CMD) having paging information and a superframe including a paging message from the BS or RS, and a controller 805 configured to shift the received superframe based upon information relating to multi-hop RS count present between the BS and the MS and a delay time on an RS link so as to monitor the paging message.

The method described so far can be implemented in software, hardware or a combination thereof. For instance, the method may be stored in a medium (e.g., a MS internal memory, a flash memory, a hard disc, etc.), and be implemented as codes or command words within a software program executable by a processor (e.g., a microprocessor in a MS).

The foregoing embodiments and advantages are merely exemplary and are not to be construed as limiting the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A method of paging an idle-mode terminal by a relay station in a multi-hop relay communication system, the method comprising:
    receiving a message from a base station belonging to a same paging group with the relay station, the message including superframe number offset information which indicates a superframe number offset to be staggered by the relay station;
    receiving an idle mode request message from the terminal;
    sending an idle mode response message to the terminal, the idle mode response message including paging information;
    receiving a first superframe from the base station, the first superframe including a paging message of the terminal and having a first superframe number;
    staggering a second superframe number of a second superframe including the paging message by the superframe number offset from the first superframe number in a decreasing order; and
    sending the second superframe including the paging message and having the staggered second superframe number to the terminal.

2. The method of claim 1, wherein the relay station send the second superframe via a downlink transmit zone.

3. The method of claim 1, wherein the paging information in the idle mode response message comprises a paging group ID, a paging cycle, a paging listening interval and a paging offset.

4. A method of receiving a paging message by an idle mode terminal in a multi-hop relay communication system, the method comprising:
    sending an idle mode request message to a base station or a relay;
    receiving an idle mode response message from the base station or the relay, the idle mode response message including paging information which comprises a paging group ID, a paging cycle, a paging listening interval, and a paging offset;
    determining a superframe number necessary for monitoring a paging message based on a relay link delay and multi-hop relay count information obtained from the base station or the relay; and
    receiving a superframe including the paging message from the relay using the determined superframe number, the superframe having the superframe number staggered by the relay by a superframe number offset.

5. The method of claim 4, wherein the multi-hop relay count information or the delay time information on the relay link is received by being included in the superframe header or the idle mode response message.

6. A relay station, characterized by transferring a paging message to an idle mode terminal in a multi-hop relay communication system, the relay comprising:
    a receiver configured to receive a message from a base station belonging to a same paging group with the relay station, the message including superframe number offset information which indicates a superframe number offset to be staggered by the relay station, and to receive a first superframe from the base station, the first superframe including a paging message of the idle mode terminal and having a first superframe number:
    a controller configured to stagger a second superframe number of a second superframe including the paging message by the superframe number offset from the first superframe number in a decreasing order; and
    a transmitter configured to send the second superframe including the paging message and having the staggered second superframe number to the terminal.

7. A terminal, characterized by operating in an idle mode in a multi-hop relay communication system, the terminal comprising:
    a transmitter configured to send an idle mode request message to a base station or a relay;
    a controller configured to determine a superframe number necessary for monitoring a paging message based on a relay link delay and multi-hop relay count information obtained from the base station or the relay; and
    a receiver configured to receive an idle mode response message including paging information which comprises a paging group ID, a paging cycle, a paging listening interval, and a paging offset, and to receive a superframe including the paging message from the relay using the determined superframe number, the superframe having the superframe number staggered by the relay by a superframe number offset.

* * * * *